Jan. 31, 1967   R. N. NORLIE ETAL   3,301,288
ROUTING MACHINE
Filed Oct. 21, 1964   3 Sheets-Sheet 1
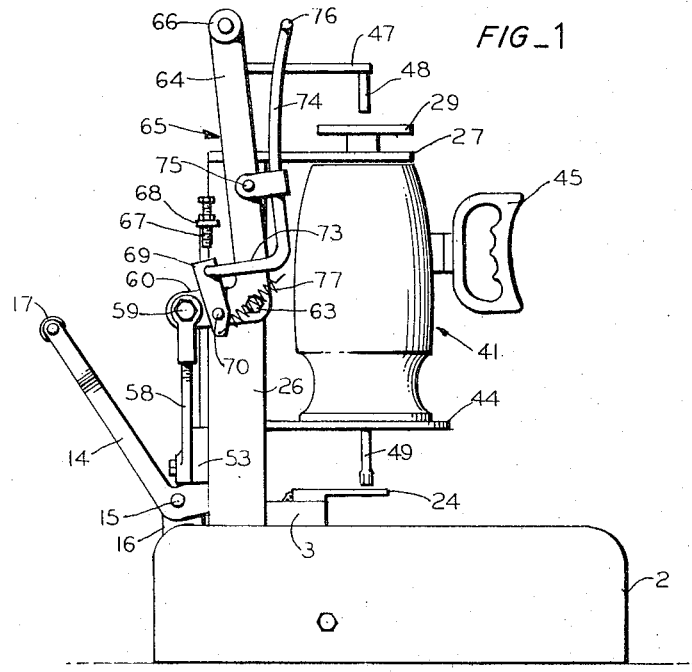
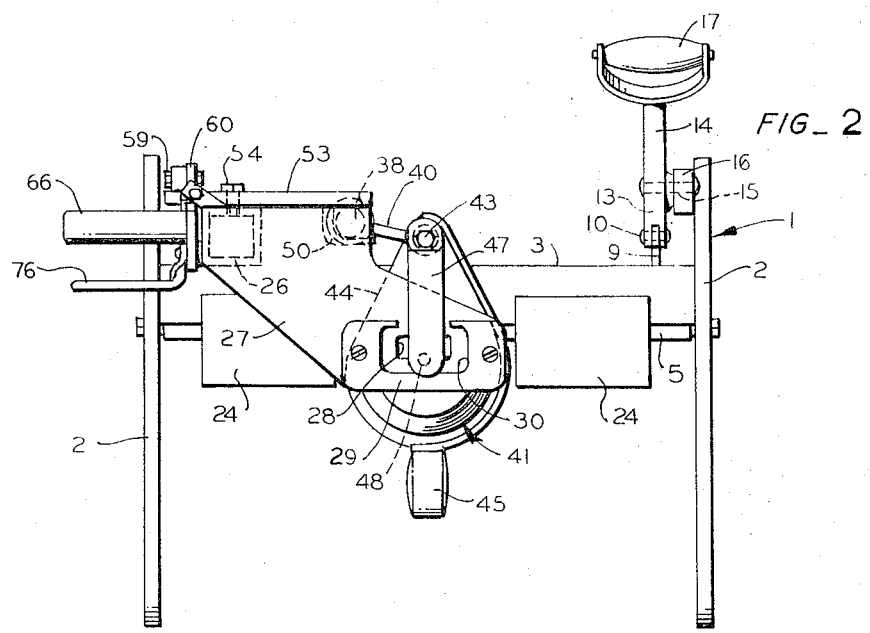
INVENTORS
ROBERT. N. NORLIE
RICHARD. M. SHEFFIELD
BY
*Boykin, Mohler & Foster*
ATTORNEYS

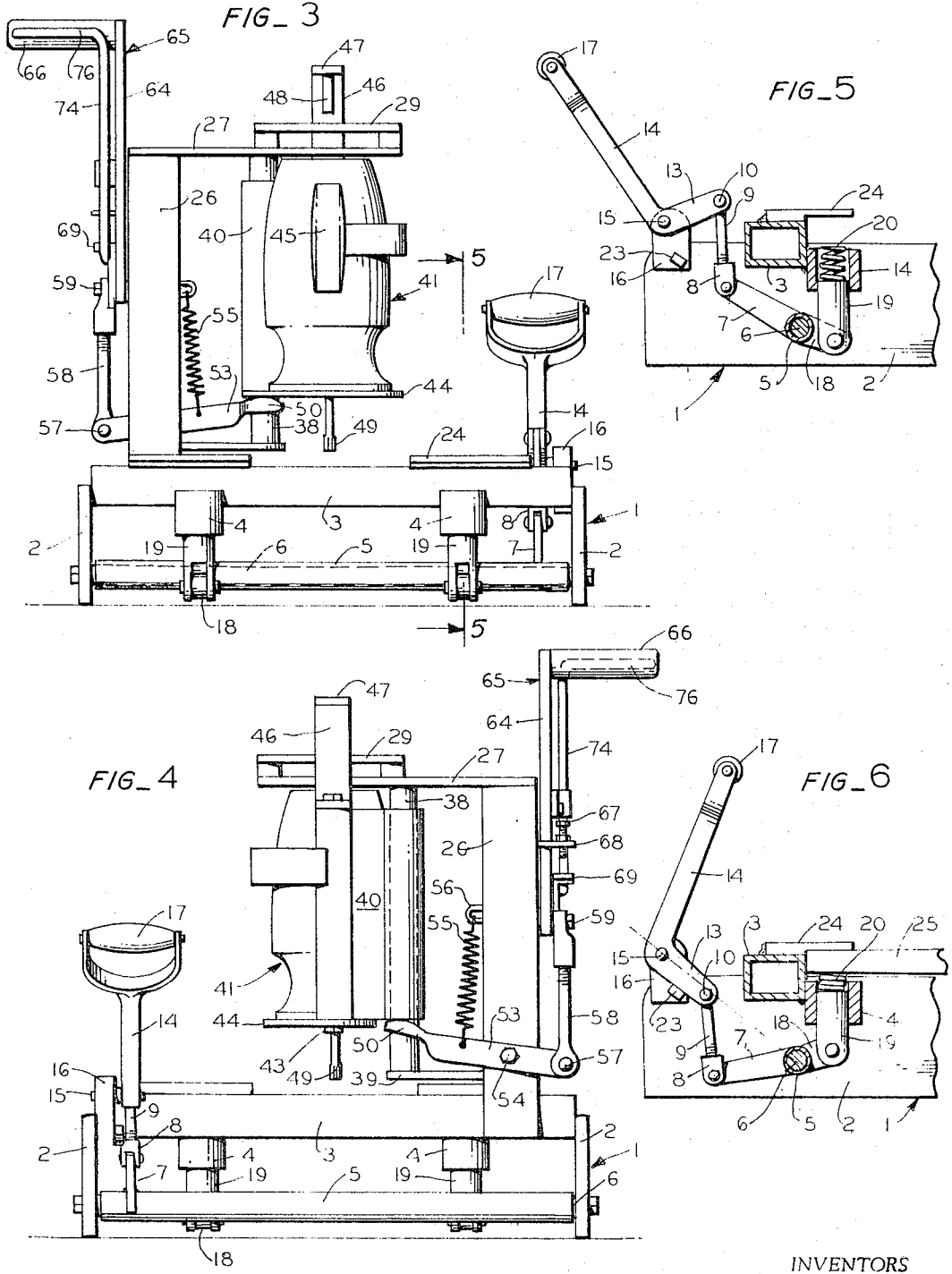

Jan. 31, 1967  R. N. NORLIE ETAL  3,301,288
ROUTING MACHINE
Filed Oct. 21, 1964  3 Sheets-Sheet 3
FIG_7
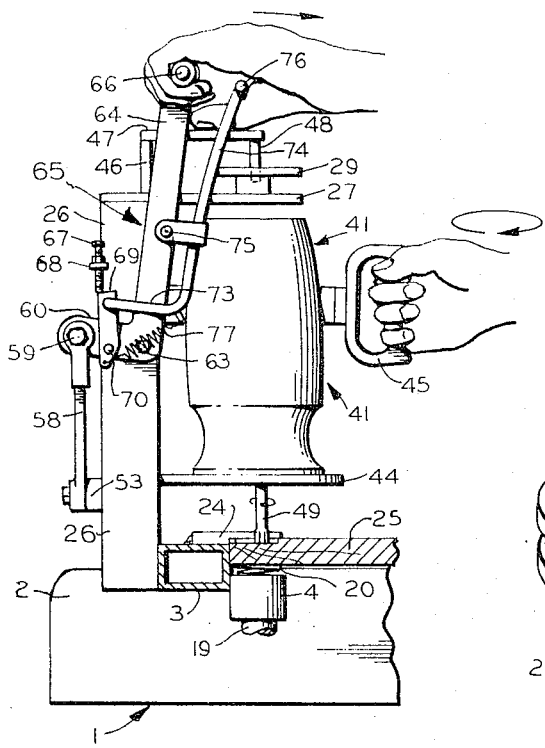
FIG_9
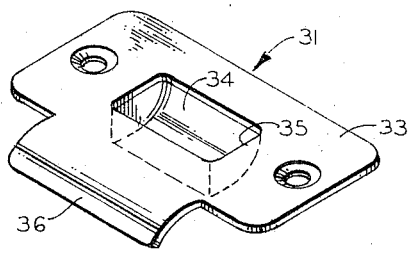
FIG_10
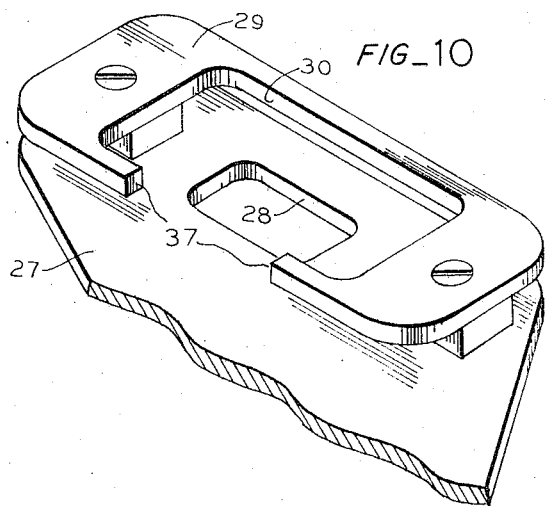
FIG_8
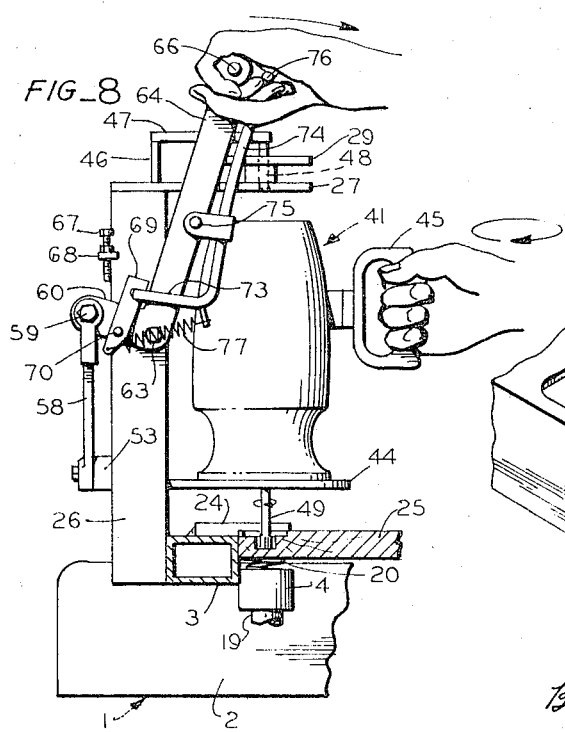
FIG_11
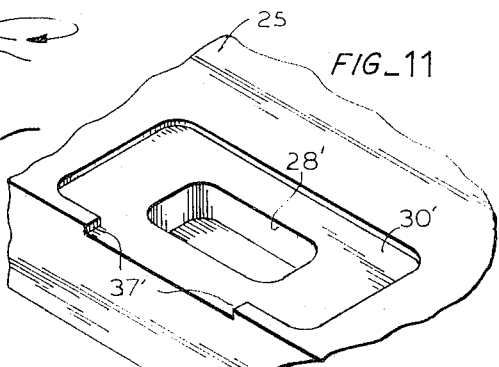
INVENTORS
ROBERT N. NORLIE
RICHARD M. SHEFFIELD
BY
Boyken, Mohler & Foster
ATTORNEYS

United States Patent Office 3,301,288
Patented Jan. 31, 1967

3,301,288
ROUTING MACHINE
Robert N. Norlie and Richard M. Sheffield, Chico, Calif.,
assignors to Norfield Manufacturing Co., Chico, Calif.
Filed Oct. 21, 1964, Ser. No. 405,415
7 Claims. (Cl. 144—144)

This invention relates to a machine for forming recesses of different depths, such, for example, as the recesses in a door jamb for receiving the lock strike of the type that includes a plate for which one shallow recess is required, and a well projecting to one side of the plate for which the deeper recess for the latch on the door is required.

One of the objects of the invention is the provision of a routing machine that includes improved means for quickly and accurately forming the recesses.

Another object of the invention is the provision of a machine that includes a pair of superposed templates as guides for guiding the router during movement of the latter in a routing operation, and means for controlling and supporting the router for movement to different depths and for holding it at each depth during the forming of the different depth recesses.

A still further object of the invention is the provision of a means on a machine adapted to releasably hold a door and a jamb in side-by-side parallel relation for processing the door and jamb, and which means is supported on said machine for movement to and from a position over the jamb in forming the multiple-depth recesses for the aforesaid lock strike and well.

Other objects and adavntages will appear in the description and drawings.

In the drawings

FIG. 1 is a side elevational view of the machine of the present invention.

FIG. 2 is a top plan view of the machine of FIG. 1.

FIG. 3 is a front elevational view of the machine.

FIG. 4 is a rear elevational view of the machine.

FIG. 5 is a sectional view taken along line 5—5 of FIG. 3 showing the jam-clamping portion in one position for receiving a jamb to be recessed.

FIG. 6 is a view similar to FIG. 5 except the parts are in jamb-clamping position, the latter being indicated in elevation.

FIG. 7 is a side elevational view of the machine showing the router bit in a position making a shallow recess for the lock strike.

FIG. 8 is a view similar to that of FIG. 7 showing the router bit in a position making the deeper recess.

FIG. 9 is an isometric view showing a lock strike.

FIG. 10 is an isometric, part sectional view showing the templates on the machine for forming the recesses for the lock strike.

FIG. 11 is a fragmentary isometric view showing the recesses formed in the jamb for the lock strike.

In detail, the machine illustrated in the drawings comprises a rigid frame generally designated 1, which frame includes a pair of similar, horizontally spaced, opposed, horizontally elongated plates 2. (See FIGS. 1 and 2.) A horizontal cross bar 3 extends between said plates adjacent to their upper edges and is welded or otherwise rigidly connected to said plates at points closer to the rear ends of said plates than to their forward ends.

The words "forwardly," "rear" and "rearwardly" are used herein with reference to the side of the machine at which the operator stands in using the machine. Such side is the forward side; hence, the rear ends of the plates 2 are the ends thereof remote from said forward side.

A pair of relatively short, vertically disposed, horizontally spaced open ended cylinders substantially equally spaced from the plates 2 are rigidly secured to bar 3 at the forward side thereof.

A horizontal hollow shaft 5 extends between plates 2 at a level spaced below bar 3, which shaft is rotatably supported on an inner horizontal shaft 6 that, in turn, is rigidly secured at its ends to plates 2. (See FIGS. 3 and 4.)

An arm 7 is rigidly connected at one end thereof with the hollow shaft 5 and projects rearwardly from said shaft radially thereof. The rear end of shaft 7 extends between and is pivotally connected with the ends of a yoke 8, and said yoke includes an upstanding, externally threaded leg 9 which, in turn, threadedly extends through a horizontal pin 10. (See FIGS. 5 and 6.) The ends of pin 10 are rotatably supported in arms 13 that, in turn, are rigid with one end of a lever arm 14.

A horizontal pivot 15, secured on an upstanding rigid portion 16 of frame 1, pivotally supports lever arm 14 and the pair of arms 13 at substantially the juncture between said pair of arms and said lever arm.

Said lever arm 14 extends at approximately a right angle to the pair of arms 13, whereby said arm 14 will form one arm of a crank and the pairs of arms 13 form the other arm.

By the above described arrangement, the swinging of the outer end of arm 14, which is provided with a hand grip 17 will effect rotation of the hollow shaft 5. The screw connection between the leg 9 and pin 10 provides for adjusting the leg relative to the pin.

Rigidly secured to the hollow shaft 5, and projecting forwardly therefrom is a pair of horizontally spaced projections 18, each extending below the lower open end of each cylinder 4. A spring support 19 is pivotally connected to each projection 18, and each such support 19 supports the lower end of a vertically disposed helical spring 20 for vertical reciprocable movement in each cylinder 4 upon oscillatory movement of hollow shaft 5 when lever arm 14 is swung between two positions, one of which may be called a clamping position and the other a releasing position, as will later appear.

When each spring 20 is at its lowermost position in each cylinder 4, the lever arm 14 will be generally vertical, projecting upwardly upon an operator at the forward side of the machine manually grasping the hand grip 17 and swinging the lever 14 forwardly and downwardly about pivot 15, the springs 20 will be moved upwardly. A stop 23 rigid with portion 16 of the frame will engage one of the arms 13 to limit the forward movement of arm 14.

Rigid on bar 3 are a pair of horizontally disposed, coplanar plates 24 that project over the springs 20, and which plates are spaced above said springs. The lower surfaces of plates 24 are at a level spaced above the upper level of the upper horizontal edges of plates 2 a sufficient distance to permit a piece of work 25, such as the side of a door frame, to be freely positioned between plates 24 and springs 20 and against the forward side of cross bar 3, when said springs are in their lowermost position. Such piece 25 will be supported on and extend across the upper edges of plates 2, which edges may be rounded in cross-sectional contour to provide line contacts with such piece 25.

The plates 24 are horizontally spaced apart a sufficient distance to at least fully expose the area of piece 25 that is to be routed out.

Upon the operator supporting piece 25 on the upper edges of plates 2 and sliding it into engagement with the front side of bar 3 and accurately positioning the area on piece 25 to be routed out exposed between plates 24, the lever 14 will be manually swung forwardly, and downwardly to the full limit permitted by stop 23. This movement will move springs 20 upwardly so they will firmly but yieldably clamp piece 25 against the lower surfaces of plates 24. The arrangement of lever 14 and its connections with shaft 5 is such that the arms 13 will be moved past dead center with respect to the tension transmitted by springs 20 through shaft 5, arm 7 and leg 9 to arms 13 and lever arm 14 will yieldably hold the arm 14 at its forward limit, or clamping position until the arm 14 is manually swung back to its upstanding releasing position. Thus, piece 25 will be firmly clamped until positively released by manually swinging the lever 24 to its said releasing position.

Rigidly secured to the cross bar 3 is a vertical post 26 projecting upwardly from said cross bar, and secured to the upper end of said post and projecting laterally therefrom over the space between plates 24 is a horizontal plate 27 (see FIGS. 3 and 4) that may be called a lower template, inasmuch as the portion of said plate 27 that is directly over said space between plates 24 is a rectangular opening 28, the edges of which define the outline of a portion on piece 25 that is to be routed out for the well of a lock strike of the type provided with a well. However, rigid with and above the portion of the template 27 is another template 29 that may be called an upper template. The latter is formed with an opening 30, the outline of which corresponds to the outline of the lock strike that is to be inserted in the portion of piece 25 to be routed out.

Before further describing the mechanism for routing out piece 25, reference is made to the lock strike that is to be secured in the portion of piece 25 that is to be routed out. Said lock strike (FIG. 9) is generally designated 31 and comprises an elongated plate 33 having a well 34 therein intermediate its ends. This well may be formed on a relatively thin plate that is rigidly secured to plate 33, or may be stamped in plate 33, the important feature being that it has side walls and a bottom wall, and which side walls extend away from an opening 35 in plate 33 and are rigid with plate 33.

The piece 25 to be routed out is illustrated (FIG. 11) as being the jamb frame member of a door, and which member is the one that is adjacent to and in opposed relation to the edge of the door (not shown) from which the door latch projects. The face of said piece 25 that is adapted to face the said edge of the door will be routed out to receive both the portion of the lock strike that extends away from the opening 35, and the well 34, and also a tongue 36 that projects laterally from the plate 33 and over which a door latch is adapted to slide for movement to the well 34 when the door is swung to closed positions.

The positional relationship between opening 28 in the lower template 27 (FIG. 10) and opening 30 in the upper template 29 is the same as the positional relationship between well 34 and the outline of plate 33. It should be noted that the edges 37 of a side opening slot into opening 30 corresponds in position to the two opposite edges of tongue 36 on the lock strike. Thus the downwardly projected outlines of the edges of the openings in the upper and lower templates will correspond to the outlines of the plate 33 and well 34.

Referring back to FIGS. 3 and 4, alongside post 26 is a vertical cylindrical bar 38, the latter extending between and rigid with a portion of the lower template 27 and a lateral extension 39 of post 26.

Swingably and vertically reciprocably supported on said vertical bar 38 is a router supporting member 40 that projects laterally from said bar 38 and a vertically disposed router 41 is swingably supported on a vertical pivot 43 (FIG. 2) carried by said member 40 at the outer portion of member 40 relative to the bar 38. Thus the router itself is swingable horizontally about the parallel axes of both bar 38 and pivot 43. A frame 44 rigid with the router is connected with pivot 43 for swinging the router about said pivot, and a hand grip or handle 45 rigid with frame 44 is adapted to be grasped by the hand of an operator for swinging the router and controlling its movement about said pivot and bar 38.

Said frame 44 includes an upward extension 46 that, in turn, has a laterally projecting arm 47 integral therewith projecting from the frame 44 in the same direction as handle 45, and the outer end of said arm 47 has a vertically downwardly projecting pin 48 rigid and integral therewith and coaxial with the router 41 and with the cutter 49 (FIG. 7).

Said pin 48 terminates in a free lower end that is spaced above the router 41.

The member 40 that is rigid with the router 41 is normally supported at its lower end on the arms of a fork 50, which fork is on one end of a generally horizontally extending lower arm 53 (see FIGS. 3 and 4). This arm 53 is pivotally supported at a point intermediate its ends on a horizontal pivot 54, that, in turn, is secured on the lower end of post 26 at the rear side of the latter. A helical spring 55 is connected at one end thereof with the portion of arm 53 between pivot 54 and fork 50, and the opposite end of said spring is connected with a bracket member 56 that is rigid with post 26 and spaced above arm 53. Thus, the spring 55 will normally hold the router 41 and member 40 in elevated position unless the forked-end of arm 53 is lowered, whereupon the member 40 will move downwardly on bar 3 under the weight of the router 41 and, of course, the router will move down to whatever distance the fork 50 is lowered.

The end of lever 53 opposite to the fork 50 is pivotally connected by a horizontal pivot 57 with the lower end of an upwardly extending link 58 (see FIGS. 3 and 4). Said link 58 is in two parts, namely, a lower part that is connected with pivot 57, and an upper part threadedly secured to the lower part thus providing for longitudinal adjustment of the link. The upper part of link 58 is pivotally connected by a horizontal pivot 59 with the outer end of a generally horizontally extending crank arm 60 of a crank that is pivotally connected to one of the lateral sides of post 26 by a horizontal pivot 63 (see FIGS. 7 and 8). The other arm of said crank is designated 64 and projects upwardly from the inner end of crank arm 60. The crank having arms 60, 64 thereon may be generally designated 65, and is preferably at the side of post 26 opposite to the router supporting bar 38, and the upper end of said arm 64 is provided with a laterally projecting handle 66 that projects a substantial distance above the level of the templates 27, 29.

Upon forward swinging of handle 66, the arm 53 will be pivoted to permit the router to move downwardly, and this downward movement is limited by the lower end of a stop bolt 67 that threadedly extends downwardly through a threaded opening in a lateral projection 68 that is rigid with the post 26. A lock nut on said bolt will hold the latter in vertically adjusted position.

Said stop is adapted to be engaged by the upper end of an upwardly extending link 69 that, in turn, is pivotally connected adjacent to its lower end with a horizontal pivot 70, carried by crank arm 60 at a point between the pivots 59 and 63. This engagement between the upper end of link 69 and bolt 67 limits downward movement of the router.

The upper end portion of said link 69 is pivotally connected with one end of a horizontal extension 73 on the lower end of a generally vertically upwardly extending lever arm 74 (see FIGS. 7 and 8). The latter is pivotally connected with the upwardly extending crank arm 64 at a point intermediate the handle 66 and pivot 63. A lateral projection on said arm 74 and rigid therewith extends alongside said arm 64 and is pivotally connected with the latter by a horizontal pivot 75 which provides the pivotal connection between said lever 74 and crank arm 60. The upper end of said lever arm 74 is formed with a thumb or finger engageable portion 76 (see FIG. 7) that is in a position about even with and spaced from the forward side of the crank arm 60 so that the thumb on the hand gripping the horizontal handle 66 may readily press said portion 76 toward and against the arm 60, thereby swinging the upper end of link 69 to one side of the stop bolt 67 against the resistance of a spring 77 that is connected at one end with a lower extension on link 69 below pivot 70 and at the other end with the lower end of lever 74 to permit further lowering of the router member 40 and router 41 to the downward limit of the fork 50, at which point the fork will engage the lower extension 39 at and rigid with the lower end portion of post 26. A release of pressure on said finger engageable portion 70 will cause the upper end of link 69 to automatically swing back to its position for engagement with the lower end of the stop bolt 67.

When the router is in its uppermost position, the cutter 49 thereon projecting downwardly therefrom will clear the upper surface of a frame piece 25 when the latter is clamped against the plates 24, and the upper surface of such piece will be spaced above the upper surface of cross bar 3 a distance slightly greater than the thickness of the plate 33 of the lock strike.

The lock strike 31, it should be noted, is symmetrical lengthwise. That is, the ends of the well are equidistant from the ends of plate 33 and the tongue 36 is equally spaced from the ends of the plate 33. The invention is not to be restricted to routing out a piece 25 for only such a lock strike, but in the example shown, such a lock strike is conventional with certain standard locks, such as a "Schlage" lock.

In operation, the position on piece 25 of the portion to be routed out for the lock strike can readily be marked, and as the template openings 28, 30 in templates 27, 29 are directly over the area between plates 24 against which the piece 25 is to be clamped, and in which area the router is to route out the material of said piece 25 for the lock strike, the piece 25 can readily be positioned for routing, after which the operator will grasp the hand grip 17 and swing it forwardly and downwardly to clamp the piece 25 against the lower surface of plates 24.

The next step is for the operator to release hand grip 17, since it will automatically stay down with lever 14 in clamping position, and to grasp the hand grip 45 on the frame 44 carrying the router 41 and swing the frame forwardly so that the depending pin 48 which is above and coaxial with cutter 49 is over the opening 30 in the upper template 29. The lower end of pin 48 is at an elevation sufficient to clear the upper surface of the upper template 29 at this time.

After the above step, the other hand of the operator will grasp and move forwardly the handle 66 on the upper end of crank arm 64, thereby permitting the router to move downwardly. The stop bolt 67 is so adjusted that the cutter 49 will cut into the piece 25 a distance equal to the thickness of the plate 33 of the lock strike 31 when the upper end of link 69 is in engagement with the lower end of said stop bolt, and when the router is moved downwardly to the limit permitted by said link 69 and the stop bolt 67, the lower end of pin 68 will be within the opening 30 in the upper template 29, but above the opening 28 in the lower template 27. The operator may then swing the router within said opening 30 and along the edges thereof and between the edges 37 of the side opening slot to completely route out the upper surface of piece 25 as at 37', 30' (FIG. 11) to a depth equal to the thickness of plate 33, and the outline of the portion so routed out will correspond to the outline of the lock strike.

After the above step, the router frame will be swung to move the cutter 49 over the opening 28 in the lower template, after which the thumb on the hand gripping handle 66 will press the finger engageable portion 76 on lever 74, thus swinging the upper end of link 69 from below the stop bolt 67, permitting the router to descend so that pin 68 will be within the opening 28 in the lower template 27 and the cutter 49, will then cut out piece 25 within the outline of opening 28 to a depth at least equal to the depth of the well 34 of the lock strike, as at 28' (FIG. 11), and the outline of the recess so cut in said piece 25 for the well 34 will correspond to the outline of the outer sides of said well.

Upon releasing the handle 66 and finger engageable portion 76 on arm 74 the router will automatically move upwardly to its uppermost position and may be swung rearwardly to inoperative position, and upon swinging lever arm 14 upwardly the piece 25 will be released.

The device as illustrated is portable; hence, may be used at different locations at the building site, although it may be secured rigidly in one location.

We claim:
1. In a machine for routing out a recess in a jamb piece of a door frame for receiving a lock strike plate of the type having a well spaced inwardly from the edges of said plate and projecting to one side of the latter;
 (a) a rigid frame;
 (b) a rotary routing cutter for routing out said recess;
 (c) supporting means on said frame supporting said cutter for bodily movement thereof laterally relative to its axis of rotation within the confines of outlines respectively corresponding to the outside outlines of said lock strike plate and the well therein, and for axial downward movement a first distance substantially equal to the thickness of said lock strike plate and a second distance substantially equal to the depth of said well when said jamb piece is held in a predetermined stationary position relative to said cutter in a position for cutting by said cutter during said movement of the latter;
 (d) holding means on said frame actuatable for movement for releasably holding such jamb piece in said predetermined position and for releasing said jamb piece;
 (e) separate guide means respectively rigid relative to said routing cutter and said frame for respectively restricting said lateral movement of said cutter to within the limits of the outline of said plate and for restricting said lateral movement to within the limits of the outline of said well;
 (f) means on said frame for restricting said axial movement of said cutter a distance substantially equally to said first distance when said lateral movement of said routing cutter is restricted to within the outline of said plate, and
 (g) means on said frame for restricting said axial movement of said cutter a distance substantially equal to said second distance when said lateral movement of said routing cutter is restricted to within the outline of said well.
2. In a machine as defined in claim 1,
 (h) said guide means including a pair of templates rigid relative to each other disposed in opposed relation each formed with an opening thereon with the edge of one defining the outline of said lock strike plate and with the edge of the other opening defining said outline of said well, and a guide member rigid relative to said cutter and movable therewith projecting into said one opening only when axial movement of said cutter is restricted a distance substantially equal to said first distance, and projecting into said other opening when said axial movement of said cutter is restricted to a distance substantially equal to said second distance.
3. In a machine as defined in claim 2,
 (i) said routing cutter being positioned between said templates and said holding means, and
 (j) said template and said member being fully exposed for viewing by an operator at a side of said machine.
4. In a machine as defined in claim 1,
 (h) movable means supported on said frame and connected with said holding means for moving the latter into and out of holding relation to said jamb piece;
 (i) means connected with said router cutter for so mov- ing the latter laterally relative to its axis of rotation within the confines of said outline of said lock strike plate;

(j) means connected with said supporting means for moving the latter distances respectively substantially equal to said first distance and said second distance;

(k) manually actuatable stop means for releasably supporting said supporting means upon movement of said cutter said first distance moveable under manual actuation thereof to a position permitting axial movement of said cutter said second distance, and (l) means on said frame for supporting said supporting means upon movement of said supporting means said second distance.

5. In a machine as defined in claim 2, (i) said rotary routing cutter being rotatable about a substantially vertical axis and in a position for cutting upon axial downward movement and lateral movement;

(j) said holding means including a pair of horizontally spaced yieldable elements on which said jamb piece is adapted to be supported and a pair of stationary, horizontally spaced members spaced above and in vertical alignment with said yieldable elements and means connected with said elements for moving them upwardly for yieldably clamping said jamb piece against said members;

(k) said supporting means supporting said router cutter for lateral swinging from a position laterally opposite relative to the space between said pair of members to a position over said space when said guide member is in a position for movement into said one opening in one of said templates.

6. A machine for routing out a recess in a jamb piece of a door frame for receiving a lock strike plate of the type having a well spaced inwardly from the edges of said plate and projecting to one side of the latter;

(a) a rigid frame;

(b) a vertically disposed routing cutter for routing out said recess in such jamb piece to be supported therebelow, upon downward and lateral movement of said cutter;

(c) holding means on said frame actuatable for movement for releasably holding a jamb piece below said cutter and means for actuating said holding means;

(d) a pair of horizontally disposed templates rigid relative to each other and rigid on said frame in a position above said cutter and in superposed relation, the upper template of said pair being formed with an opening therein with the edge of one opening defining the outline of said lock strike plate and with the edge of the opening in the lower template of said pair defining said outline of said well, the downwardly projected outlines of said edges being directly over the area on said jamb piece that is to be recessed when said jamb piece is held by said holding means, and the downwardly projected outline of the edges defining the outline of said well being spaced within the confines of the downwardly projected outline of the edges defining the outline of said plate;

(e) a guide member spaced above said cutter coaxial and rigid therewith, and means over said guide member supporting the latter in depending relation for extending downwardly into each of said openings in said template upon downward movement of said cutter;

(f) supporting means supporting said cutter and guide means for lateral swinging thereof as a unit to and from a position in which said guide member is over and within said openings in said templates and said cutter is over a jamb piece in said holding means, and for vertical reciprocable movement of said guide means and cutter to and from a position in which said guide means is within said openings, and means for so swinging and reciprocating said cutter and guide means;

(g) manually actuatable means operably connected with said supporting means for selectively moving said cutter and guide means downwardly a first distance and a longer second distance for successively routing out an area in said jamb piece for said lock strike plate and for said well with lateral movement of said guide means respectively restricted to within the confines of the edges of the opening in said upper template when said cutter and guide means are moved downwardly said first distance, and to within the confines of the edges of said opening in said lower template when said cutter and guide means are moved downwardly said second distance.

7. In a machine as defined in claim 6;

(h) said means for actuating said holding means being offset to one lateral side of said cutter, guide means and template, and said means for selectively moving said cutter and guide means downwardly to said different distances being at the opposite lateral side of said cutter, guide means and templates, and a hand grip operably connected with said cutter for manual swinging said cutter laterally.

References Cited by the Examiner
UNITED STATES PATENTS 1,718,324  6/1929  Wappat _____ 144—70
3,221,784  12/1965  Skollerud _____ 144—144.5

DONALD R. SCHRAN, *Primary Examiner.*